United States Patent [19]

Dore

[11] 4,396,544
[45] Aug. 2, 1983

[54] ASYMMETRIC 1:2 CHROMIUM COMPLEXES OF MONOAZO COMPOUNDS

[75] Inventor: Jacky Dore, Basel, Switzerland

[73] Assignee: Sandoz Ltd., Basel, Switzerland

[21] Appl. No.: 188,624

[22] Filed: Sep. 19, 1980

[30] Foreign Application Priority Data

Sep. 24, 1979 [CH] Switzerland .................. 8600/79

[51] Int. Cl.³ .................. C07C 107/00; C09B 45/48
[52] U.S. Cl. .................. 260/145 A; 260/150; 260/151; 260/196
[58] Field of Search .................. 260/145 A

[56] References Cited

U.S. PATENT DOCUMENTS

| | | | |
|---|---|---|---|
| 2,806,760 | 9/1957 | Brassel et al. | 260/145 A X |
| 2,906,746 | 9/1959 | Brassel et al. | 260/145 A |
| 3,005,813 | 10/1961 | Brassel et al. | 260/145 A |
| 3,516,980 | 6/1970 | Dore et al. | 260/145 A |
| 3,632,568 | 1/1972 | Neier | 260/145 A |
| 4,159,983 | 7/1979 | Dore | 260/145 A |

FOREIGN PATENT DOCUMENTS

1163713 9/1969 United Kingdom.

*Primary Examiner*—Charles F. Warren
*Assistant Examiner*—Margaret B. Medley
*Attorney, Agent, or Firm*—Gerald D. Sharkin; Richard E. Vila; Melvyn M. Kassenoff

[57] ABSTRACT

1:2 Chromium complexes of the formula,

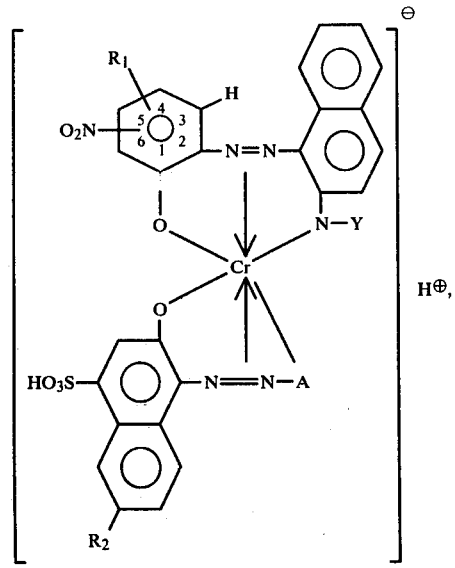

in which
$R_1$ is hydrogen, chlorine, bromine, nitro (being meta to the first nitro group), $C_{1-4}$alkyl or $C_{1-4}$alkoxy,
$R_2$ is hydrogen or nitro,
Y is

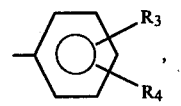

wherein
$R_3$ is hydrogen, chlorine, bromine, trifluoromethyl, $C_{1-4}$alkyl or $C_{1-4}$alkoxy, and
$R_4$ is hydrogen, chlorine, bromine, $C_{1-4}$alkyl or $C_{1-4}$alkoxy, and
A is a

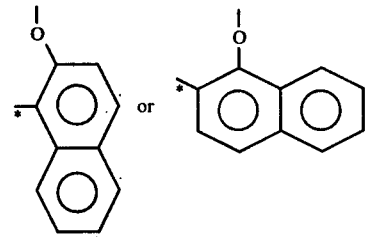

wherein the carbon atom marked with the * is bound to the azo radical,
which complexes are in free acid or salt form, and mixtures thereof, are useful for dyeing and printing nitrogen-containing organic substrates, for example, natural and synthetic polyamides such as wool, silk and nylon, polyurethanes, polyolefins modified to contain basic groups and leather, for dyeing metals such as anodized aluminum and in printing lacquers and ball-point pen inks.

26 Claims, No Drawings

ASYMMETRIC 1:2 CHROMIUM COMPLEXES OF MONOAZO COMPOUNDS

The present invention relates to asymmetric 1:2 chromium complexes, their preparation and use as dyestuffs.

More particularly, the present invention provides complexes of formula I,

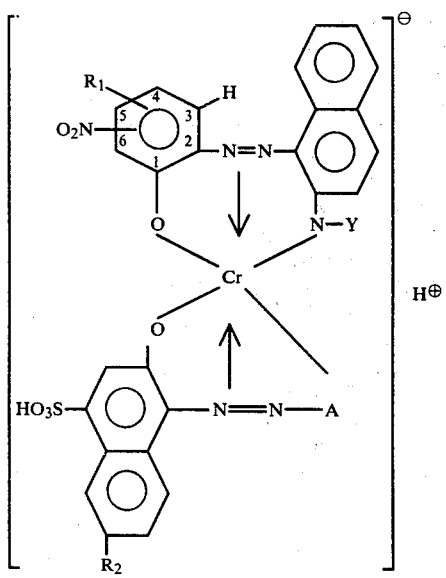

in which $R_1$ is hydrogen, chlorine, bromine, nitro (being meta to the first nitro group), $C_{1-4}$alkyl or $C_{1-4}$alkoxy, $R_2$ is hydrogen or nitro, Y is a radical of the formula

wherein $R_3$ is hydrogen, chlorine, bromine, trifluoromethyl, $C_{1-4}$alkyl or $C_{1-4}$alkoxy and $R_4$ is hydrogen, chlorine, bromine, $C_{1-4}$alkyl or $C_{1-4}$alkoxy, A is a divalent radical of formula (a) or (b),

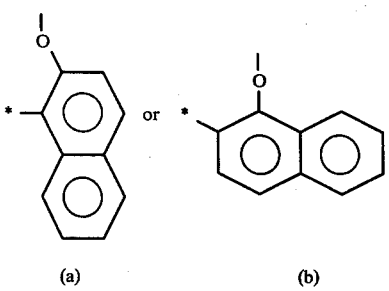

in which the carbon atom marked with the asterisk is bound to the azo group,
and mixtures of such complexes, which complexes are in free acid or salt form.

Any alkyl or alkoxy groups as $R_1$ preferably contain 1 or 2 carbon atoms, more preferably 1 carbon atom.

When $R_1$ is hydrogen, the nitro group is preferably in the 4- or 5-position, especially in the 5-position. When $R_1$ is chlorine or bromine, the two substituents $R_1$ and nitro are preferably in the 4,5- or 4,6-positions, more preferably in the 4,5-positions and especially $R_1$ is in the 4-position and nitro is in the 5-position. When $R_1$ is alkyl or alkoxy, the two substituents $R_1$ and nitro are preferably in the 4,6-positions.

$R_1$ is preferably $R_1'$, where $R_1'$ is hydrogen, chlorine, nitro, $C_{1-2}$alkyl or $C_{1-2}$alkoxy. More preferably $R_1$ is $R_1''$, where $R_1''$ is hydrogen, chlorine, nitro, methyl or methoxy. Most preferably $R_1$ is $R_1'''$, where $R_1'''$ is hydrogen, chlorine or nitro, especially hydrogen or nitro.

$R_2$ is preferably hydrogen.

Any alkyl as $R_3$ or $R_4$ is preferably $C_{1-2}$alkyl, especially methyl. Any alkoxy as $R_3$ or $R_4$ is preferably $C_{1-2}$alkoxy, especially methoxy.

$R_3$ is preferably $R_3'$, where $R_3'$ is hydrogen, chlorine, bromine, $C_{1-2}$alkyl, $C_{1-2}$alkoxy or trifluoromethyl. More preferably $R_3$ is $R_3''$, where $R_3''$ is hydrogen, chlorine, methyl or methoxy. Most preferably $R_3$ is hydrogen, chlorine or methyl, especially hydrogen.

$R_4$ is preferably $R_4'$, where $R_4'$ is hydrogen, chlorine, methyl or methoxy, especially hydrogen.

Y is preferably a radical of formula (c),

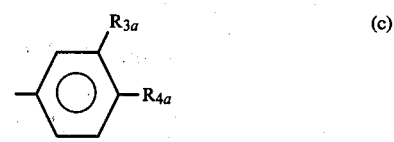

in which one of $R_{3a}$ and $R_{4a}$ is hydrogen and the other has one of the significances of $R_3'$, or is a radical of formula (d),

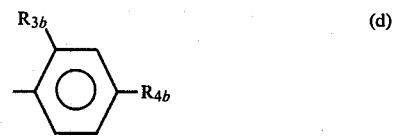

in which $R_{3b}$ is methyl and $R_{4b}$ is hydrogen or methyl or $R_{3b}$ is chlorine or bromine and $R_{4b}$ is hydrogen.

More preferably (c) is a radical of formula (c$_1$),

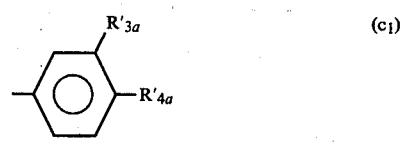

in which one of $R_{3a}'$ and $R_{4a}'$ is hydrogen and the other has one of the significances of $R_3''$. Most preferably (c) is a group (c$_2$), where (c$_2$) is a group of formula (c$_1$), wherein one of $R_{3a}'$ and $R_{4a}'$ is hydrogen and the other is hydrogen, chlorine or methyl, with hydrogen being especially preferred.

More preferably (d) is a radical of formula (d$_1$),

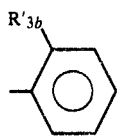

in which R$_{3b}'$ is chlorine or methyl. Most preferably (d) is a group (d$_2$), where (d$_2$) is a radical of formula (d$_1$), wherein R$_{3b}'$ is chlorine.

Y is preferably Y', where Y' is a group of formula (c) or (d). More preferably Y is Y'', where Y'' is a group of formula (c$_1$) or (d$_1$). Even more preferably Y is Y''', where Y''' is a group of formula (c$_2$) or (d$_2$). Most preferably Y is an unsubstituted phenyl group.

A is preferably a radical of formula (a).

Preferred complexes of formula I are
(1) those wherein R$_1$ is R$_1'$;
(2) those wherein R$_1$ is R$_1''$;
(3) those of (1) or (2), wherein R$_1$ (when other than hydrogen) and the nitro group are in the preferred positions as mentioned above;
(4) those wherein, in the radical Y, R$_3$ is R$_3'$ and R$_4$ is R$_4'$;
(5) those wherein Y is Y';
(6) those wherein Y is Y'';
(7) those wherein R$_2$ is hydrogen;
(8) those of (1) to (7), wherein A is a radical of formula (a);
(9) those of (1) wherein R$_2$ is hydrogen;
(10) those of (1) wherein Y is Y', preferably Y'', more preferably Y''' and most preferably phenyl;
(11) those of (5) wherein R$_1$ is R$_1'$, and R$_2$ is hydrogen;
(12) those of (5) wherein R$_2$ is hydrogen;
(13) those of formula Ia

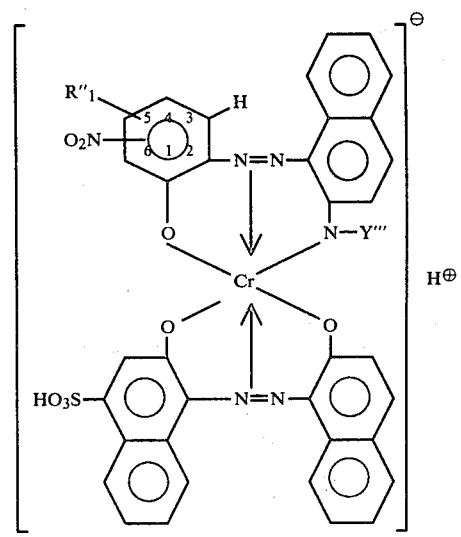

in which the nitro group and R$_1''$ (when other than hydrogen) are in the preferred positions as mentioned above, which R$_1''$ and Y''' are as defined above and, preferably, complexes are preferably in salt form;
(14) those of (13), wherein R$_1''$ is R$_1'''$, especially hydrogen or nitro;
(15) those of (13) or (14), wherein Y''' is unsubstituted phenyl.

The sulpho group present in the 1:2 chromium complexes of formula I may be in the free acid or preferably nonchromophoric salt form. Suitable salt forms are those common in anionic metal complex dyestuffs, for example alkali metal salts and unsubstituted or substituted ammonium salts. As examples of suitable cations, may be given lithium, sodium, potassium, ammonium, mono-, di-, tri- and tetra-methylammonium, triethylammonium and mono-, di- and tri- ethanolammonium. The preferred salts are alkali metal salts and unsubstituted ammonium salts, especially sodium salts.

To convert the sulpho group into the substituted ammonium salt form also those amines may be employed which being present as the corresponding ammonium cations reduce the water solubility of the complexes such that the complexes are soluble in water only in the presence of an organic solvent or that they are only soluble in organic solvents. Examples of such cations include those derived from N-ethyl-N-hexylamine, cyclohexylamine, N,N-dicyclohexylamine and cyclic amines such as morpholine.

The 1:2 chromium complexes are in free acid or salt form. By 'salt form' is meant that the sulpho group in the molecule is in salt form and additionally the cation compensating the negative charge on the metal ion may be hydrogen or one of the cations of the salt form of the sulpho group. The cation of the sulpho group and that compensating the negative charge on the metal ion may be the same or different; normally, they are the same.

More preferably the 1:2 complexes are in the alkali metal or unsubstituted ammonium salt form and the cation of the sulpho group and that of the complex anion are preferably the same.

The present invention further provides a process for the production of asymmetric 1:2 chromium complexes of formula I and mixtures thereof, comprising reacting a 1:1 chromium complex of a monoazo compound of formula II,

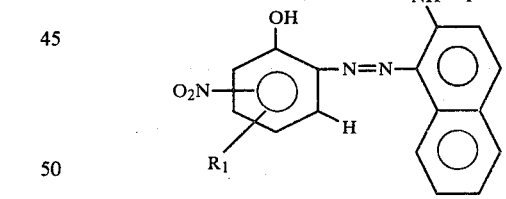

or a mixture thereof, or of a monoazo compound of formula III,

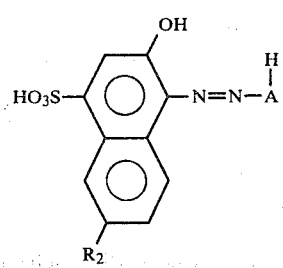

or a mixture thereof, with one or more metal-free monoazo compounds of formula III or II, respectively.

The reaction for the production of the asymmetrical 1:2 chromium complexes may be carried out in conventional manner. Preferably the 1:1 chromium complex of the sulpho group-containing compound of formula III is reacted with the sulpho-free compound of formula II. Advantageously, the reactants are employed in approximately stoichiometrical amounts.

The reaction may be carried out in aqueous, aqueous-/organic or organic medium. Examples of organic solvents include low molecular weight alcohols such as ethanol or carboxylic acid amides such as formamide or an alkylated derivative thereof, glycols such as ethylene glycol, di- or tri-ethylene glycol or ether derivatives thereof.

The reaction is suitably effected at pH 5 to 12, the preferred pH being from 6 to 9, and at temperatures of up to 100° C. The reaction is completed after all the 1:1 chromium complex has been reacted. The product obtained may be isolated in conventional manner, for example by salting out or weakly acidifying, and after washing with a salt solution may be collected and dried.

The preparation of the 1:1 chromium complexes of the compounds of formula II or III used as starting materials may be carried out in accordance with known methods. Preferably the preparation is effected in aqueous medium at pH 1 to 4, the preferred pH being 2 to 3, and at temperatures of up to 150° C., preferably at 100° to 140° C.

The monoazo compounds of formula II and III are either known or may be prepared in accordance with known methods using known starting materials.

The asymmetric 1:2 chromium complexes of formula I and mixtures thereof, preferably in the alkali metal or ammonium salt form or in a salt form derived from an organic amine, are useful for dyeing or printing nitrogen-containing organic substrates. Especially suitable are textile substrates consisting of or comprising natural or synthetic polyamides, such as wool, silk and nylon, polyurethanes or basic-modified polyolefins; the complexes are also suitable for dyeing or printing leather.

The complexes of formula I which are in a salt form well soluble in water, i.e. those containing cations other than hydrogen or an amine such as N-ethyl-N-hexylamine, cyclohexylamine, N,N-dicyclohexylamine or cyclic amines such as morpholine in the ammonium form, are also useful for dyeing metals, especially anodized aluminium.

The complexes of formula I which are in a salt form soluble in organic solvents and scarcely soluble or insoluble in water, containing substituted ammonium ions as given above, may also be used in the preparation of printing lacquers and ball-point pen inks.

Dyeing and printing may be carried out in accordance with known methods. The complexes of formula I and mixtures thereof may be employed as such or may be used in the form of liquid or solid preparations.

Preferably water-soluble organic solvents, optionally mixed with water, are used for the liquid preparations which are in the form of stable concentrated stock solutions; conventional additives such as solubilizing agents (e.g. urea) may be added thereto. These stock solutions may be simply diluted with water. Such preparations may be made, for example, in accordance with the procedure described in German Pat. No. 1,619,470 or in German patent application No. 2,033,989. Also concentrated stable aqueous preparations which contain conventional additives may be used.

Storage-stable liquid dye preparations may also be obtained by a liquid-liquid-extraction, comprising forming a homogeneous or practically homogeneous solution of the dyestuff in water or a water-miscible organic solvent, e.g. an organic acid amide, a glycol ether or a polyglycol, at an elevated temperature, optionally adding salt to the mixture, and separating the predominantly organic solvent phase, containing dyestuff, from the predominantly aqueous phase in accordance with the method described in German patent application No. 2,816,983.

Solid preparations which are in powder or granulate form with an average particle size of at least $20\mu$ can be used, which preparations contain conventional additives such as standardising agents and optional further aids. Such solid preparations may be made, for example, in accordance with the procedure described in British Pat. No. 1,370,845.

Further, the complexes of formula I and mixtures thereof may be made up into preparations which are dispersible in cold water. Such dispersions may be prepared, for example, by grinding the dye, dry or wet, in aqueous dispersing medium in the presence of one or more conventional anionic dispersing agents and optionally in the presence of other conventional additives, optionally with subsequent spray-drying. The preparations so obtained are finely dispersed in cold water.

The dyeings obtained with the 1:2 chromium complexes according to the invention exhibit very good general fastness properties, especially light fastness and wet fastnesses, such as fastness to washing, milling, water, potting or perspiration. They also show notable rubbing fastness and resistance to carbonization, ironing, wool chlorination and the action of acids and alkalis.

The dyestuffs build-up notably; they exhaust from a neutral medium on polyamide fibres and build-up tone-in-tone due to their asymmetrical character. The dyestuffs also build-up comparably on wool and nylon when dyed together. They are also suitable for use in combination with other dyestuffs having similar dyeing properties. These combination dyeings exhibit good light fastness.

The 1:2 chromium complexes which are in a water-soluble salt form may be formed into stable printing pastes which build-up well on all types of polyamides. The stability of the printing pastes especially in acid medium is notable.

The following Examples further serve to illustrate the invention. In the Examples, all parts and percentages are by weight except when otherwise indicated and all degrees are in degrees Centigrade.

EXAMPLE 1

The paste of the 1:1 chromium complex obtained from 106.4 parts of the monoazo dyestuff 1-amino-2-hydroxynaphthalene-4-sulphonic acid→2-hydroxynaphthalene, and 101 parts of the monoazo dyestuff obtained by the acid coupling of diazotised 2-amino-4,6-dinitro-1-hydroxybenzene with 2-phenylaminonaphthalene are stirred into sufficient water to give 1200 parts by volume, to which 60 parts ethyl glycol are added. The reaction mixture is set at a pH of 6.0–7.0 by adding 30% sodium hydroxide solution (to keep at this value during the whole reaction ca. 50 parts 30% sodium hydroxide solution are required) and is subsequently stirred at 90° until both of the starting materials are no longer chromatographically detectable or only in small traces. After about 2 to 3 hours the reaction is complete.

After cooling to 50°-60°, 180 parts sodium chloride are added. Stirring is effected for 30 minutes at 50°-60°. The reaction mixture then is filtered and the precipitate is dried at 100°. The dyestuff which, in the free acid form, corresponds to the formula

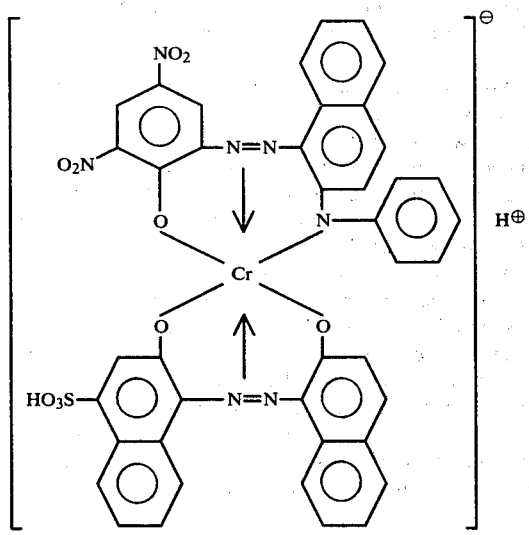

is obtained in the sodium salt form. The dyestuff is well soluble in water and gives dyeings on natural or synthetic polyamide fibres (such as wool, nylon satin, Perlon or Helanca) in greenish deep-grey to greenish black shades (depending on the amount of dyestuff employed). The dyeings show very good general wet fastnesses and excellent light fastness.

In the following Table further 1:2 chromium complexes of formula I are given which may be prepared in analogy with the procedure described in Example 1. The corresponding starting materials (the sulpho group-containing 1:1 chromium complex and the metal-free compound) are listed in the Table. In analogous manner it is possible to prepare the complexes of formula I by reacting the 1:1 chromium complex of the sulpho group-free compound with the sulpho group-containing metal-free compound. The 1:2 chromium complexes of the Table (in sodium salt form due to the reaction and isolation conditions) give dyeings on natural and synthetic polyamide fibres which show good general fastnesses such as wet fastnesses and light fastness. The shade of the polyamide dyeings in all cases is slightly greenish-black or greenish-grey (depending on the amount of dyestuff employed).

TABLE

| Ex. No. | Compound of formula III in the form of a 1:1 Cr complex | Compound of formula II in metal-free form |
|---|---|---|
| 2 | 1-amino-2-hydroxynaphthalene-4-sulphonic acid → 2-hydroxynaphthalene | 2-amino-1-hydroxy-5-nitrobenzene → 2-phenylaminonaphthalene |
| 3 | 1-amino-2-hydroxynaphthalene-4-sulphonic acid → 2-hydroxynaphthalene | 2-amino-1-hydroxy-5-nitrobenzene → 2-(3'-chlorophenyl)aminonaphthalene |
| 4 | 1-amino-2-hydroxynaphthalene-4-sulphonic acid → 2-hydroxynaphthalene | 2-amino-4-chloro-1-hydroxy-5-nitrobenzene → 2-phenylaminonaphthalene |
| 5 | 1-amino-2-hydroxynaphthalene-4-sulphonic acid → 2-hydroxynaphthalene | 2-amino-4,6-dinitro-1-hydroxybenzene → 2-(3'-chlorophenyl)aminonaphthalene |
| 6 | 1-amino-2-hydroxynaphthalene-4-sulphonic acid → 2-hydroxynaphthalene | 2-amino-1-hydroxy-4-methyl-6-nitrobenzene → 2-phenylaminonaphthalene |
| 7 | 1-amino-2-hydroxynaphthalene-4-sulphonic acid → 2-hydroxynaphthalene | 2-amino-1-hydroxy-6-methyl-4-nitrobenzene → 2-phenylaminonaphthalene |
| 8 | 1-amino-2-hydroxynaphthalene-4-sulphonic acid → 2-hydroxynaphthalene | 2-amino-1-hydroxy-4-methoxy-6-nitrobenzene → 2-phenylaminonaphthalene |
| 9 | 1-amino-2-hydroxy-6-nitro-naphthalene-4-sulphonic acid → 2-hydroxynaphthalene | 2-amino-4,6-dinitro-1-hydroxybenzene → 2-phenylaminonaphthalene |
| 10 | 1-amino-2-hydroxy-6-nitro-naphthalene-4-sulphonic acid 2-hydroxynaphthalene | 2-amino-4,6-dinitro-1-hydroxybenzene → 2-(3'-chlorophenyl)aminonaphthalene |
| 11 | 1-amino-2-hydroxy-6-nitro-naphthalene-4-sulphonic acid → 2-hydroxynaphthalene | 2-amino-4-chloro-1-hydroxy-5-nitrobenzene → 2-phenylaminonaphthalene |
| 12 | 1-amino-2-hydroxy-6-nitro-naphthalene-4-sulphonic acid → 2-hydroxynaphthalene | 2-amino-4-chloro-1-hydroxy-5-nitrobenzene → 2-(3'-chlorophenyl)aminonaphthalene |
| 13 | 1-amino-2-hydroxy-6-nitro-naphthalene-4-sulphonic acid → 2-hydroxynaphthalene | 2-amino-1-hydroxy-5-nitrobenzene → 2-phenylaminonaphthalene |
| 14 | 1-amino-2-hydroxy-6-nitro-naphthalene-4-sulphonic acid → 2-hydroxynaphthalene | 2-amino-1-hydroxy-4-methyl-6-nitrobenzene → 2-phenylaminonaphthalene |
| 15 | 1-amino-2-hydroxynaphthalene-4-sulphonic acid → 1-hydroxynaphthalene | 2-amino-4-chloro-1-hydroxy-5-nitrobenzene → 2-phenylaminonaphthalene |

TABLE-continued

| Ex. No. | Compound of formula III in the form of a 1:1 Cr complex | Compound of formula II in metal-free form |
|---|---|---|
| 16 | 1-amino-2-hydroxynaphthalene-4-sulphonic acid → 1-hydroxynaphthalene | 2-amino-4,6-dinitro-1-hydroxybenzene → 2-phenylaminonaphthalene |
| 17 | 1-amino-2-hydroxynaphthalene-4-sulphonic acid → 1-hydroxynaphthalene | 2-amino-4-chloro-1-hydroxy-5-nitrobenzene → 2-(2'-chlorophenyl)aminonaphthalene |
| 18 | 1-amino-2-hydroxynaphthalene-4-sulphonic acid → 1-hydroxynaphthalene | 2-amino-1-hydroxy-5-nitrobenzene → 2-phenylaminonaphthalene |
| 19 | 1-amino-2-hydroxynaphthalene-4-sulphonic acid → 2-hydroxynaphthalene | 2-amino-4-chloro-1-hydroxy-6-nitrobenzene → 2-phenylaminonaphthalene |
| 20 | 1-amino-2-hydroxynaphthalene-4-sulphonic acid → 2-hydroxynaphthalene | 2-amino-4,6-dinitro-1-hydroxybenzene → 2-(4'-chlorophenyl)aminonaphthalene |
| 21 | 1-amino-2-hydroxynaphthalene-4-sulphonic acid → 2-hydroxynaphthalene | 2-amino-6-chloro-1-hydroxy-4-nitrobenzene → 2-phenylaminonaphthalene |
| 22 | 1-amino-2-hydroxynaphthalene-4-sulphonic acid → 2-hydroxynaphthalene | 2-amino-4,6-dinitro-1-hydroxybenzene → 2-(2',4'-dimethylphenyl)aminonaphthalene |
| 23 | 1-amino-2-hydroxynaphthalene-4-sulphonic acid → 2-hydroxynaphthalene | 2-amino-4,6-dinitro-1-hydroxybenzene → 2-(4'-methylphenyl)aminonaphthalene |
| 24 | 1-amino-2-hydroxynaphthalene-4-sulphonic acid → 2-hydroxynaphthalene | 2-amino-4,6-dinitro-1-hydroxybenzene → 2-(4'-methoxyphenyl)aminonaphthalene |
| 25 | 1-amino-2-hydroxynaphthalene-4-sulphonic acid → 2-hydroxynaphthalene | 2-amino-1-hydroxy-4-nitrobenzene → 2-phenylaminonaphthalene |

The dyestuffs of Example 1 to 25 which are in the sodium salt form may, depending on the reaction/isolation conditions, be obtained in accordance with known methods in free acid form or in other salt forms, for example those salt forms indicated in the description hereinbefore.

EXAMPLE 26

150 Parts of the dry dyestuff of Example 1 are dissolved in 150 parts diethylene glycol monobutyl ether and 600 parts water. The salt content is adjusted to 150 g/l and an approximately homogeneous solution is formed.

This solution is subsequently heated to boiling, whereby two passes are formed. The upper dark coloured dyestuff-solvent phase and the lower almost colourless aqueous phase which contains salt are separated at just below boiling point. The dye content in the separated organic phase is about 45% and the preparation is stable on storage.

Similar results may be obtained using the same amount of a polyethylene glycol (m.w. 300), polypropylene glycol (m.w. 3000) or dimethylbenzamide instead of the diethylene glycol monobutyl ether.

In analogous manner liquid dyestuff preparations which are stable on storage may be made using any one of the dyestuffs of the examples given in the Table.

Application Example A 0.1 Parts of the dyestuff of Example 1 are dissolved in 300 parts water, and 0.2 parts ammonium sulphate are added thereto. Subsequently, pre-wetted material (5 parts wool gabardine or 5 parts nylon satin) is entered into the bath which is heated over the course of 30 minutes to boiling temperature. During dyeing, the water that evaporates is continuously replaced and dyeing is completed at boiling temperature for another 30 minutes, followed by rinsing. After drying, a greenish deep-grey dyeing having good light- and wet-fastnesses is obtained.

Similarly, the dyes of Examples 2 to 25 or mixtures of two or more of the dyestuffs of Examples 1 to 25 or a preparation according to Example 26 may be employed to dye wool or nylon in accordance with the method described above.

Application Example B

Polyamide is printed with a printing paste containing:
50 parts dyestuff of Example 1
50 parts urea
50 parts solubilizing agent (e.g. thiodiethylene glycol)
300 parts water
500 parts suitable thickening agent (e.g. based on carob bean gum)
60 parts acid-donating agent (e.g. ammonium tartrate)
60 parts thiourea.

The printed textile goods are steamed for 40 minutes at 102° (saturated steam), rinsed cold, subsequently washed at 60° for 5 minutes with a dilute solution of a conventional detergent and rinsed again with cold water. A greenish deep-grey print having good light- and wet-fastnesses is obtained.

In analogous manner printing pastes may be made employing any one of the dyestuffs of Examples 2 to 25 or a mixture of two or more of the dyestuffs of Examples 1 to 25. Such pastes may be employed for printing in accordance with the above given procedure.

What is claimed is:
1. A 1:2 chromium complex of the formula

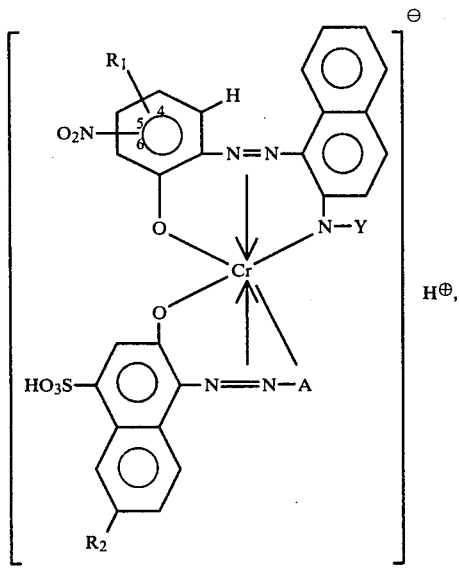

or a salt thereof,
wherein
$R_1$ is hydrogen, chloro, bromo, nitro, $C_{1-4}$alkyl or $C_{1-4}$alkoxy, with the proviso that when $R_1$ is nitro, the two nitro groups are meta to each other,
$R_2$ is hydrogen or nitro,
Y is

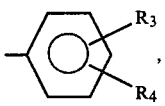

wherein
$R_3$ is hydrogen, chloro, bromo, trifluoromethyl, $C_{1-4}$alkyl or $C_{1-4}$alkoxy, and
$R_4$ is hydrogen, chloro, bromo, $C_{1-4}$alkyl or $C_{1-4}$alkoxy, and
A is

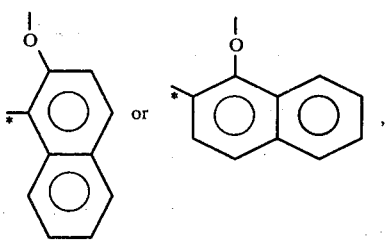

wherein the * denotes the carbon atom bound to the —N=N— radical,
or a mixture of such 1:2 chromium complexes in free acid or salt form.

2. A 1:2 chromium complex according to claim 1, or a salt thereof.

3. A 1:2 chromium complex according to claim 2, or a salt thereof each cation of which is independently lithium, sodium, potassium, ammonium, methylammonium, dimethylammonium, trimethylammonium, tetramethylammonium, triethylammonium, ethanolammonium, diethanolammonium, triethanolammonium, N-ethyl-N-hexylammonium, cyclohexylammonium, N,N-dicyclohexylammonium or morpholinium.

4. A 1:2 chromium complex according to claim 3, or a salt thereof each cation of which is independently lithium, sodium, potassium or ammonium.

5. A 1:2 chromium complex according to claim 4, or a salt thereof each cation of which is lithium, sodium, potassium or ammonium.

6. A 1:2 chromium complex according to claim 2, or a salt thereof,
wherein $R_1$ is hydrogen, chloro, nitro, $C_{1-2}$alkyl or $C_{1-2}$alkoxy, with the proviso that when $R_1$ is nitro, the two nitro groups are meta to each other.

7. A 1:2 chromium complex according to claim 2 or 6, or a salt thereof,
wherein $R_2$ is hydrogen.

8. A 1:2 chromium complex according to claim 6, or a salt thereof,
wherein $R_1$ is hydrogen, chloro, nitro, methyl or methoxy, with the proviso that when $R_1$ is nitro, the two nitro groups are meta to each other.

9. A 1:2 chromium complex according to claim 8, or a salt thereof,
wherein (i) when $R_1$ is hydrogen, the nitro group is in the 4- or 5-position,
(ii) when $R_1$ is chloro, $R_1$ is in the 4-position and the nitro group is in the 5- or 6-position or the nitro group is in the 4-position and $R_1$ is in the 5- or 6-position,
(iii) when $R_1$ is methyl or methoxy, $R_1$ is in the 4-position and the nitro group is in the 6-position or the nitro group is in the 4-position and $R_1$ is in the 6-position, and
(iv) when $R_1$ is nitro, the two nitro groups are in the 4- and 6-positions.

10. A 1:2 chromium complex according to claim 2, or 6, or a salt thereof,
wherein
(i) when $R_1$ is hydrogen, the nitro group is in the 4- or 5-position,
(ii) when $R_1$ is chloro or bromo, $R_1$ is in the 4-position and the nitro group is in the 5- or 6-position or the nitro group is in the 4-position and $R_1$ is in the 5- or 6-position,
(iii) when $R_1$ is $C_{1-4}$alkyl or $C_{1-4}$alkoxy, $R_1$ is in the 4-position and the nitro group is in the 6-position or the nitro group is in the 4-position and $R_1$ is in the 6-position, and
(iv) when $R_1$ is nitro, the two nitro groups are in the 4- and 6-positions.

11. A 1:2 chromium complex according to claim 2 or 6, or a salt thereof,
wherein
Y is wherein one or $R_{3a}$ and $R_{4a}$ is hydrogen, chloro, bromo, $C_{1-2}$alkyl, $C_{1-2}$alkoxy or trifluoromethyl and the other is hydrogen,
$R_{3b}$ is methyl, chloro or bromo, and $R_{4b}$ is hydrogen or methyl, with the proviso that $R_{4b}$ is hydrogen when $R_{3b}$ is chloro or bromo.

12. A 1:2 chromium complex according to claim 11 or a salt thereof,
wherein
Y is

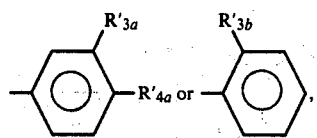

wherein one of $R_{3a}'$ and $R_{4a}'$ is hydrogen, chloro, methyl or methoxy and the other is hydrogen, and $R_{3b}'$ is methyl or chloro.

13. A 1:2 chromium complex according to claim 12, or a salt thereof,
wherein one of $R_{3a}'$ and $R_{4a}'$ is hydrogen, chloro or methyl and the other is hydrogen, and
$R_{3b}'$ is chloro.

14. A 1:2 chromium complex according to claim 13, or a salt thereof, wherein Y is phenyl.

15. A 1:2 chromium complex according to claim 11, or a salt thereof, wherein $R_2$ is hydrogen.

16. A 1:2 chromium complex according to claim 2 having the formula

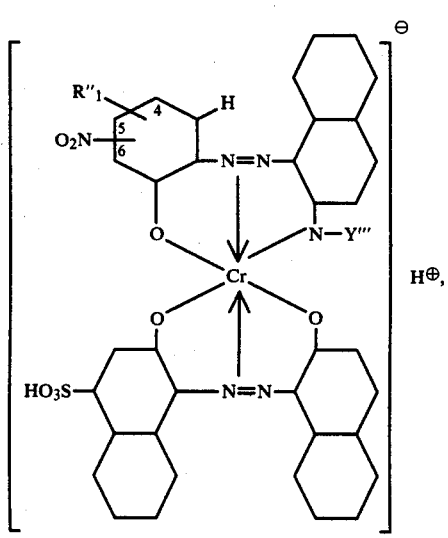

(Ia)

or a salt thereof,
wherein
$R_1''$ is hydrogen, chloro, nitro, methyl or methoxy, with the proviso that when $R_1''$ is nitro, the two nitro groups are meta to each other, and
$Y''''$ is

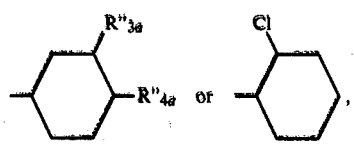

wherein one of $R_{3a}''$ and $R_{4a}''$ is hydrogen, chloro or methyl and the other is hydrogen.

17. A 1:2 chromium complex according to claim 16, or a salt thereof, wherein $R_1''$ is hydrogen, chloro or nitro, with the proviso that when $R_1''$ is nitro, the two nitro groups are meta to each other.

18. A 1:2 chromium complex according to claim 16 or 17, or a salt thereof,
wherein $Y''''$ is phenyl.

19. The 1:2 chromium complex according to claim 17 having the formula

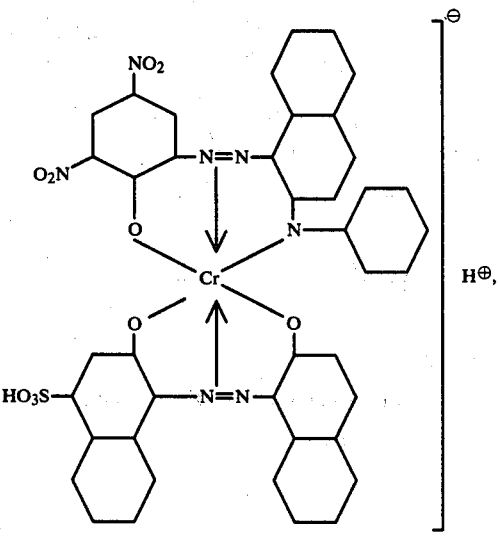

or a salt thereof.

20. The 1:2 chromium complex according to claim 19 in sodium salt form.

21. The 1:2 chromium complex according to claim 17 having the formula

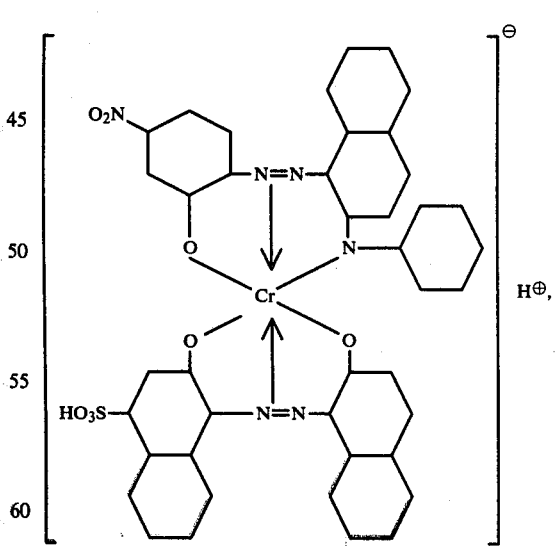

or a salt thereof.

22. The 1:2 chromium complex according to claim 21 in sodium salt form.

23. The 1:2 chromium complex according to claim 17 having the formula

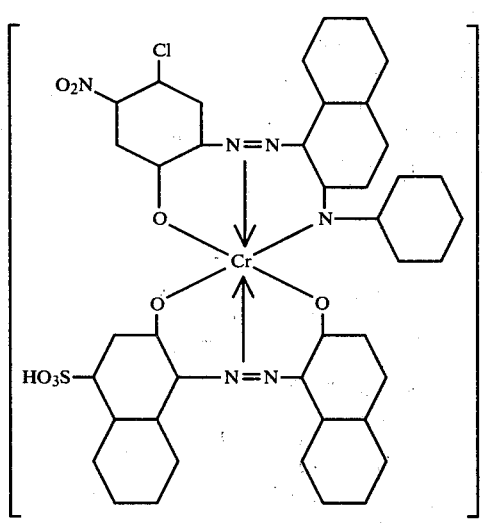
or a salt thereof.
24. The 1:2 chromium complex according to claim 21 in sodium salt form.
25. The 1:2 chromium complex according to claim 17 having the formula
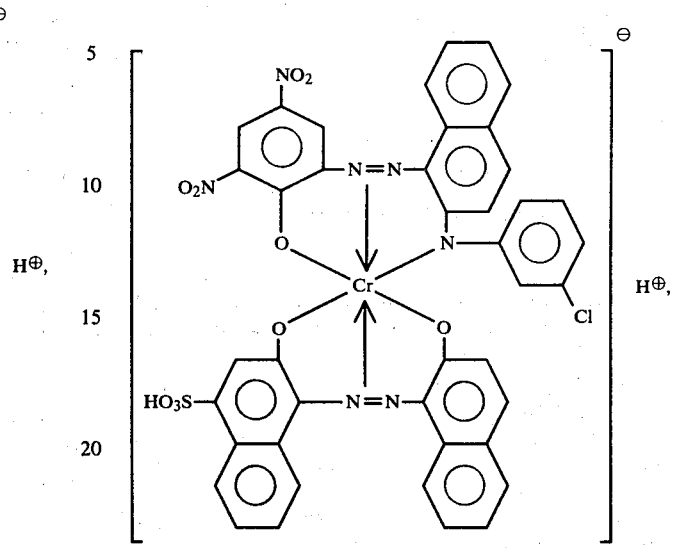
or a salt thereof.
26. The 1:2 chromium complex according to claim 25 in sodium salt form.
* * * * *